United States Patent [19]
Oya et al.

[11] 3,865,779
[45] Feb. 11, 1975

[54] PROCESS FOR PREPARING REINFORCING ADDITIVES TO BE APPLIED TO INORGANIC CEMENTS

[75] Inventors: Seigo Oya, Kyoto; Hiroo Noro, Akashi; Kisaburo Suzuki, Kyoto, all of Japan

[73] Assignee: Hiromichi Murata, Kobe-shi, Hyogo-ken, Japan

[22] Filed: May 5, 1972

[21] Appl. No.: 250,821

Related U.S. Application Data

[63] Continuation-in-part of Ser. No. 11,322, Feb. 13, 1970, abandoned.

[52] U.S. Cl.............. 260/42.44, 106/99, 260/37 N, 260/42.13, 260/42.45
[51] Int. Cl. .................... C08f 45/04, C08f 45/16
[58] Field of Search ..... 260/41 A, 37 N, 41 B, 40 P

[56] References Cited
UNITED STATES PATENTS

| | | | |
|---|---|---|---|
| 2,467,339 | 4/1949 | Seymour | 260/41 A |
| 2,467,340 | 4/1949 | Seymour | 260/41 A |
| 3,011,904 | 12/1961 | Ballentine | 260/41 A |
| 3,279,974 | 10/1966 | Twilley | 260/37 N |
| 3,324,060 | 6/1967 | Scopp | 260/41 A |
| 3,354,114 | 11/1967 | Doyle | 260/41 A |
| 3,366,597 | 1/1968 | Fort | 260/40 P |
| 3,368,992 | 2/1968 | Altermatt | 260/37 N |
| 3,397,171 | 8/1968 | Iler | 260/37 N |
| 3,404,119 | 10/1968 | Harper | 260/37 N |
| 3,484,402 | 12/1969 | Drake | 260/41 A |

OTHER PUBLICATIONS
Chemical Engineering, June 11, 1962, p. 207.

*Primary Examiner*—Morris Liebman
*Assistant Examiner*—Paul R. Michl
*Attorney, Agent, or Firm*—Wenderoth, Lind & Ponack

[57] ABSTRACT

Additives for preparing reinforced inorganic cements are prepared by combining certain polymers, inorganic materials or cement and a surfactant, mixing and melting the above mixture and then extruding it into fibers of desired shape. The resultant fibers are excellent reinforcing additives for inorganic cements.

3 Claims, No Drawings

PROCESS FOR PREPARING REINFORCING ADDITIVES TO BE APPLIED TO INORGANIC CEMENTS

This application is a continuation-in-part of application Ser. No. 11,322 filed Feb. 13, 1970 now abandoned.

DETAILED EXPLANATION OF INVENTION

The present invention relates to a process for preparing reinforcing additives to be applied to inorganic cements characterized by mixing one or more resins selected from the group consisting of polyethylene, polypropylene, polyvinyl chloride, polyamide and a copolymer of styrene with acrylonitrile and 0.1 – 3.0% by weight of the said resin of a hydrophilic surfactant and a stabilizer, if necessary, by further adding to the above mixture adequate amounts of a hydraulic cement such as portland cement and white portland cement or inorganic powders which are stable at heating (about 300°C) such as silica powder and thoroughly mixing the whole mixture, by (1) spinning the molten mixture into fibers having solid or hollow circular or noncircular cross-section and drawing or crimping the fibers, or (2) extruding the melt into a thin film, drawing and splitting it off as fibers, and by finally cutting the resulting fibers to adequate lengths.

To improve the strength of cement structures with respect to the impact resistance, some countermeasures have been proposed in which, for instance, rubber latex or synthetic resin emulsions of various kinds or inorganic fibers such as iron wires, asbestos fibers and glass fibers were admixed to the cement mortar. These materials, however, are not free from drawbacks and, therefore, they are not universal additives for reinforcing cement.

On the other hand, water and alkali resistant synthetic fibers, which were developed afterward, were mixed in the mortar or networks of the fibers, and were piled in layers in the mortar to improve the impact resistance of the cement. Some improvement of impact resistance was attained by using certain species of synthetic fibers. Since the fibers for this purpose are required to have high resistance to water and alkali and high stability, they are poorly bonded to the cement paste due to their hydrophobic property which is closely related to water resistance, so that they could be easily pulled out of the dried mortar in which they have been admixed. Therefore they do not contribute to improving resistance to stretching, bending and compressing of the mortar. In addition, fibers of low density polyethylene and polypropylene, when they are admixed with the mortar, are poorly dispersed in the mortar and are liable to float on the surface of the mortar, which inevitably results in nonuniform physical properties of the product.

The present invention provides a process for preparing reinforcing additives to be applied to inorganic cements which are free from the drawbacks of synthetic fibers as described above.

In this invention, the reinforcing additives to be applied to inorganic cements are prepared by mixing one or more polymeric resins in pellet or powder form selected from the group consisting of polyethylene, polypropylene, polyvinyl chloride, polyamide and a copolymer of styrene and acrylonitrile and 0.1 – 3.0% of a hydrophilic surfactant based on the weight of the resin and a small amount of stabilizer, such as a metallic salt of monovalent higher fatty acid, if necessary, and by further adding to the above mixture adequate amounts of a hydraulic cement such as portlant cement and white cement, water hardenable lime or water hardenable magnesia-lime, or inorganic powders which are stable under heating (to about 300°C) such as anhydrous gypsum silica sand or limestone and then thoroughly mixing the whole mixture, by (1) spinning the molten mixture into fibers having solid, hollow circular or noncircular cross-sections and drawing or crimping the fibers, or (2) extruding the melt into a thin film, drawing and splitting it as fibers, and by finally cutting the resulting fibers to adequate lengths.

In the present invention, hydrophilic surfactants such as the metallic salt of a triamine type amphoteric surfactant or sorbitan-mono-stearate, which are stable to heat and mixable with other resins, are added to the composite raw materials of synthetic fibers in the amount of 0.1 – 3.0%, whereby the surfactant not only remarkably improves the uniformity of mixing of the inorganic powders with the resins which results in an easier operation of spinning or extruding of the molten mixture, but also diminishes the contact angle between water and the surface of the fibers, hence decreases the vacancies formed between the cement paste and the fibers due to the hydrophobic property of the fibers and therefore exhibits a remarkable effect in increasing the physical strength of the cement structure.

In the case where polyvinyl chloride is used for the material of synthetic fibers, addition of a few percent of stabilizer, such as a metallic salt of a monovalent higher fatty acid is required to perform spinning or extrusion of molten materials.

In the fibers obtained by spinning the mixture of the synthetic resins, the hydrophilic surfactant and the stabilizer, if necessary, and inorganic additions or in the thin films obtained by extruding the same mixture, both being neither drawn nor crimped, the powders of inorganic matter are uniformly dispersed and strongly bonded with the resin and each particle is coated with the resin film so that the adhesive property thereof to a cement paste is improved only slightly as compared with that of the synthetic fibers themselves.

In this invention, to the contrary, fibers or films obtained as above are drawn or crimped in order to increase the strength of the fibers or films and to expose a part of the inorganic powder of the fiber by breaking partially the surface of the resin film so that a strong bond with the cement paste is assured and at the same time density of the formation as a whole is increased by adding high density inorganic powders to low density resins so as to facilitate uniform dispersion into the cement paste as well as to facilitate the extrusion of the film. An additional advantage of the drawing treatment is the easy splitting off of the film thus obtained.

Actually, the reinforcing additives applied to inorganic cements which were obtained by cutting the above fibers to adequate lengths were dispersed uniformly, when mixed with a cement paste, without floating and flocculating on the surface and were tightly bound with the cement at the exposed parts of inorganic powders. Furthermore, by reducing vacancies between the cement paste and the fibers due to the hydrophobic property of resin as a result of the action of the hydrophilic surfactant, and by increasing the bond between the cement paste and fibers, not only the impact resistance but also the resistance to stretching, bending and compression of the resulting mortar is increased.

A preferred range of cement to polymer is 10–50 parts by weight of cement to 100 parts by weight of polymer, and a preferred range of fiber to cement is 1–5%.

An operable range of fiber length is 5–100 mm.; preferably 10–15 mm for cement or mortar reinforcement and 30–80 for concrete reinforcement. The preferred ranges of temperature of melt extrusion are as under:

150°–250°C for polyethylene
220°–290°C for polypropylene
160°–180°C for vinyl chloride
220°–260°C for nylon
230°–250°C for acrylonitrile-styrene copolymer The range of proportions for each of the constituents are: (per 100 parts of thermoplastic synthetic resin)

The hydrophilic surfactant: 0.1–3.0 weight parts
The inorganic materials: 20–80 weight parts
A preferred range for the inorganic materials: 30–60 weight parts.

The fiber thickness is 50–300 denier, preferably 50 to 150 denier for mortar and cement and 150–250 denier for concrete.

The particle size of inorganic materials is between 5 and 50 microns.

COMPARATIVE EXAMPLE 69.5 parts by weight of polypropylene in pellet form, 0.5 part of a triamine type surfactant and 30.0 parts of normal portland cement were mixed. And 69.5 parts by weight of nylon in pellet form, 0.5 part of a triamine type surfactant, (AMS–313) available from Lion Yushi KK), and 30.0 parts of normal portland cement were mixed. Each mixture was melted, spun, drawn and cut into a length of about 15 mm to obtain the respective reinforcing additives. Each of the additives in the amount of 3 parts by weight was added to a cement mortar consisting of 100 parts of normal portland cement, 300 parts of sand and 55 parts of water, and the resulting mixture was formed into shape. The formed matter was taken out of the mold after 24 hours and cured in a wet atmosphere for 6 days at 20°± 2°C and at 93 – 95% relative humidity. The final product was tested with the Charpy impact testing machine, which gave the following results shown in Table 1 and Table 2.

Table 1

Relation between impact energy and width of cracks (Width of cracks in mm)

| Impact energy (Kg-m) | Width of cracks in mm | | |
|---|---|---|---|
| | 0.60 | 1.50 | 2.25 |
| No additive added | 0.14 | — | — |
| Additive containing polypropylene | 0.01 | 0.25 | 0.93 |
| Additive containing nylon | 0.02 | 0.28 | 1.29 |

Table 2

Relation between impact energy and depth of cracks (Depth of cracks in mm)

| Impact energy (Kg-m) | Depth of cracks in mm | | | |
|---|---|---|---|---|
| | 0.50 | 1.00 | 1.50 | 2.25 |
| No additive added | 12.0 | — | — | — |

Table 2-Continued

Relation between impact energy and depth of cracks (Depth of cracks in mm)

| Impact energy (Kg-m) | Depth of cracks in mm | | | |
|---|---|---|---|---|
| | 0.50 | 1.00 | 1.50 | 2.25 |
| Additive containing polypropylene | 0.0 | 8.0 | 12.0 | 14.4 |
| Additive containing nylon | 2.0 | 12.0 | 14.5 | 16.0 |

EXPERIMENT 2

69.5 parts by weight of polypropylene, 30.0 parts of normal portland cement and 0.5 part of a triamine type surfactant were mixed and molten. The melt was then spun into fibers and are drawn about 3 times as long and cut to 10–15mm length. 3.0 Parts by weight of the reinforcing additive thus obtained was mixed with a cement mortar consisting of 100 parts of normal portland cement, 65 parts of water and 200 parts of standard sand from Toyoura and the whole mixture was formed into shape. This was taken out of the mold after 2 days, enclosed in a polyethylene bag, and cured for 7 days in a thermostated room at 20° ± 2°C. Strength against stretching, bending and compressing of the final product mortar was tested according to the testing method of physical properties of mortar (JIS R–5201). The results are shown in Table 3 in the ratios to those obtained with a mortar which was prepared without any additive.

Table 3

| Thickness of fibers (Denier) | Ratio of strength | | |
|---|---|---|---|
| | Stretching | Bending | Compressing |
| No additive added | 1.00 | 1.00 | 1.00 |
| 137 denier | 1.21 | 1.17 | 1.08 |
| 215 denier | 1.18 | 1.05 | 1.15 |

EXPERIMENT 3

The reinforcing additive prepared in Experiment 2, fibers of 100% polpropylene (spun from melt and drawn) and fibers prepared by spinning of a melt containing cement and polypropylene but not drawn, all of an approximately equal thickness, were used to make mortar formations. Strength of them was tested as in Experiment 2 and the results are shown in Table 4 in the ratios to those of the mortar to which no additive was applied.

Table 4

| Fibers admixed | Ratio of strength | | | |
|---|---|---|---|---|
| | Thickness (Denier) | Stretching | Bending | Compressing |
| No additive | — | 1.00 | 1.00 | 1.00 |
| 100% Polypropylene | 133 | 0.87 | 0.88 | 0.84 |
| Not drawn | 130 | 0.89 | 0.86 | 0.85 |
| Additive of this invention | 137 | 1.19 | 1.18 | 1.08 |

It is concluded from the above experiments that the reinforcing additives to cement prepared by the process of the present invention not only remarkably improve the impact resistance but also increases the resistance to stretching, bending and compressing of mortars of cements, and thus exhibits an effect entirely different from that expected from addition of synthetic fibers themselves.

The thickness and the length of the reinforcing additives depend, of course, on the material of fibers and the object to which they are added. But fibers over 50 denier approximately are considered suitable in view of the process of manufacturing and the effect obtained by the additive.

The reinforcing additives of this invention to be applied to inorganic cements proved to be very effective if applied to fragile gypsum boards.

Examples of the present invention as shown below.

EXAMPLE 1

To a thorough mixture consisting of 69.5 parts by weight of pellets of nylon 6 and 0.5 part of a triamine type surfactant, was added 30.0 parts of white portland cement and the whole mixture was mixed thoroughly. This was melted at 220°–230°C and was spun into fibers of a circular cross-section of about 0.4mm diameter. After being cooled, the fibers were drawn 4 times as long and the resulting fibers of about 0.2mm diameter were cut to 15mm length to make a reinforcing additive to be applied to inorganic cements.

EXAMPLE 2

To a mixture of equal weights of polyethylene and polypropylene in pellets in the total amount of 69.5 parts by weight, 0.5 part of a triamine type surfactant was added and mixed, to which 30.0 parts of normal portland cement was added and mixed thoroughly. The whole mixture was melted at 280°C and extruded into a film. After being cooled the film was drawn about 6 times as long and split off as fibers and cut to 10mm length which are to be used as a reinforcing additive for inorganic cements.

EXAMPLE 3

To a thorough mixture consisting of 69.5 parts by weight of polyvinyl chloride in powder, 4.0 parts of zinc stearate and 1.5 parts of sorbitan mono-stearate, 25.0 parts of fine powders of silica sand was added and mixed thoroughly. The whole mixture was melted at 150°C and spun into fibers of hollow section and cooled. The fibers were drawn 2 times as long then cut to 15mm length, which are used as a reinforcing additive to be applied to inorganic cements.

EXAMPLE 4

80 parts by weight of acrylonitrile-styrene resin in pellet form and 1 part of a metallic salt of triamine type surfactant (AMS–313 available from Lion Yushi KK) were thoroughly mixed, and to this mixture 19 parts of white portland cement was added and mixed, subjected to melt spinning at 230°–250°C, and the fibers thus obtained were cooled, crimped into 3 times length having about 0.12 mm diameter and cut into 10mm length to obtain a reinforcing material.

What is claimed is:

1. An organic cement reinforcing additive in fiber form consisting essentially of:
   a polyvinylchloride matrix having uniformly dispersed therein:
   a. 30 to 60 parts by weight per 100 parts by weight of said polyvinylchloride and one or more inorganic powdered materials stable at 300°C, having a particle size of 5 to 50 microns
   and
   b. 0.1 to 3.0 parts by weight per 100 parts by weight of said polyvinylchloride of a hydrophylic surfactant;
   said fiber having a thickness of 50 to 300 denier and a length of 5 to 100 mm,
   the particles of said inorganic powdered material protruding through the surface of said fiber.

2. An inorganic cement reinforcing fiber according to claim 1 wherein the inorganic powdered material is selected from the group consisting of water-hardenable lime, water hardenable magnesia lime, alumina cement, portland cement and white cement.

3. An inorganic cement reinforcing fiber according to claim 2 wherein the cement is portland or white cement.

* * * * *